(12) United States Patent
Jin et al.

(10) Patent No.: US 10,378,729 B2
(45) Date of Patent: Aug. 13, 2019

(54) MICRO-MOLDED SHEET FOR BACKLIGHT MODULE

(75) Inventors: Qingsong Jin, Shanghai (CN); Qing Wang, Shanghai (CN)

(73) Assignee: SHANGHAI CCS INDUSTRIAL INVESTMENT HOLDING CO., LTD., Shanghai (CN)

(*) Notice: Subject to any disclaimer, the term of this patent is extended or adjusted under 35 U.S.C. 154(b) by 397 days.

(21) Appl. No.: 13/643,021

(22) PCT Filed: Jul. 2, 2010

(86) PCT No.: PCT/CN2010/074911
§ 371 (c)(1),
(2), (4) Date: Jan. 7, 2013

(87) PCT Pub. No.: WO2011/130950
PCT Pub. Date: Oct. 27, 2011

(65) Prior Publication Data
US 2013/0100680 A1   Apr. 25, 2013

(30) Foreign Application Priority Data

Apr. 23, 2010   (CN) .......................... 2010 1 0160660

(51) Int. Cl.
*F21V 11/16* (2006.01)
*G02B 3/00* (2006.01)
(Continued)

(52) U.S. Cl.
CPC ........ *F21V 11/16* (2013.01); *B29D 11/00346* (2013.01); *B29D 11/00663* (2013.01); *B82Y 20/00* (2013.01); *G02B 3/0031* (2013.01);

*G02B 6/0051* (2013.01); *G02B 6/0065* (2013.01); *B29C 59/046* (2013.01); *B29C 2035/0827* (2013.01); *G02B 6/0053* (2013.01);
(Continued)

(58) Field of Classification Search
CPC combination set(s) only.
See application file for complete search history.

(56) References Cited

U.S. PATENT DOCUMENTS 7,072,115 B2   7/2006   Uekita et al. ................. 359/599
7,160,018 B2   1/2007   Chen et al. ................... 362/620
(Continued)

FOREIGN PATENT DOCUMENTS

CN      1249461       4/2000      .............. G02B 5/02
CN      1372148      10/2002
(Continued)

OTHER PUBLICATIONS

International Search Report, International Application No. PCT/CN2010/074911, 3 pages, dated Feb. 10, 2011.
(Continued)

*Primary Examiner* — Samir Shah
(74) *Attorney, Agent, or Firm* — Dragon Sun Law Firm, PC; Jinggao Li, Esq.

(57) ABSTRACT

A micro-molded sheet for backlight module, includes: a base material layer formed from transparent material; a coating, which comprises adhesive and nano-particles, formed on the upper surface of the base material layer; and a micro-molded array layer mounted on the upside of the coating.

8 Claims, 3 Drawing Sheets

(51) Int. Cl.
*F21V 8/00* (2006.01)
*B29D 11/00* (2006.01)
*B82Y 20/00* (2011.01)
B29C 59/04 (2006.01)
B29C 35/08 (2006.01)
G02F 1/1335 (2006.01)

(52) U.S. Cl.
CPC .. *G02F 1/133611* (2013.01); *G02F 1/133615* (2013.01); *G02F 2001/133607* (2013.01); *G02F 2202/28* (2013.01); *G02F 2202/36* (2013.01)

(56) References Cited

U.S. PATENT DOCUMENTS

| | | | |
|---|---|---|---|
| 2002/0114169 | A1 | 8/2002 | Harada et al. |
| 2006/0077322 | A1* | 4/2006 | Chuang et al. ............... 349/113 |
| 2006/0134362 | A1* | 6/2006 | Lu et al. ...................... 428/40.1 |
| 2007/0212533 | A1 | 9/2007 | Jones et al. |
| 2008/0030994 | A1* | 2/2008 | Chang ................. G02B 3/0056 362/330 |
| 2009/0097273 | A1* | 4/2009 | Chang ........................... 362/618 |
| 2009/0229733 | A1* | 9/2009 | Kishioka ............. C09D 133/08 156/60 |
| 2010/0086743 | A1 | 4/2010 | Wang et al. |
| 2010/0270502 | A1* | 10/2010 | Takimoto et al. ....... 252/299.01 |
| 2017/0182460 | A1* | 6/2017 | Mitchelmore ....... B01D 61/025 |

FOREIGN PATENT DOCUMENTS

| | | |
|---|---|---|
| CN | 101118337 | 2/2008 |
| JP | 2001133605 | 5/2001 |
| WO | 2007/046649 | 4/2007 |
| WO | 2009/069977 | 6/2009 |
| WO | 2010/005655 | 1/2010 |

OTHER PUBLICATIONS

International Preliminary Report on Patentability, International Application No. PCT/CN2010/074911, 5 pages, dated Feb. 10, 2011.
Chinese Office Action (English translation) issued in PCT/CN20100160660.8, 4 pages, dated Dec. 1, 2010.
Search Report (with English translation), Application No. CN20101060660.8, 4 pages, dated Dec. 1, 2010.
Extended European Search Report dated Jan. 2, 2017 for counterpart European patent application No. 10850083.6.
European Office Action dated May 14, 2019.

* cited by examiner

MICRO-MOLDED SHEET FOR BACKLIGHT MODULE

CROSS-REFERENCE TO RELATED APPLICATIONS

This application is a national stage application of PCT/CN2010/074911, filed on Jul. 2, 2010, which claims the right of priority of Chinese patent application No. 201010160660.8, entitled "Micro-molded Sheet for Backlight Module", and filed on Apr. 23, 2010, the entire contents of which are herein incorporated by reference.

FIELD OF THE INVENTION

The present invention relates to the field of liquid crystal displays, and more particularly to a micro-molded sheet for a backlight module.

BACKGROUND OF THE RELATED ART

Generally speaking, backlight modules with various of structures are used to enhance the brightness of backside illumination flat-panel displays, such as liquid crystal displays (LCDs) including not only electronic illumination boards, notebook computer displays, word processors, desktop computer displays, television sets, camcorders, but also displays of vehicles and aircrafts. The backlight module is equipped with a light source, a light guide plate and a plurality of optical sheets, and light from the light source exits to the display after passing through the light guide plate and the plurality of optical sheets.

FIG. 1 is a schematic view summarily illustrating a prior-art backlight module. As shown in FIG. 1, the backlight module includes a light source 4; a light guide plate 5 for changing the path of light exiting from the light source 4 to guide the light to a display (not shown in the figure); a plurality of optical sheets 6, 7, 8 disposed between the light guide plate 5 and the display (not shown in the figure) to enhance the efficiency of light exiting from the light guide plate 5; a reflecting plate 2 disposed below the light guide plate 5 to prevent light produced by the light source 4 from being exposed to the outside; a light source reflecting plate 3; and a modular frame 1, on which are sequentially stacked the reflecting plate 2, the light source reflecting plate 3, the light guide plate 5 and the optical sheets 6, 7, 8.

During the process of fabrication, the optical sheets 6, 7, 8 may consist of a diffusion sheet 6, a prism sheet 7 and a protection sheet 8, wherein the diffusion sheet 6 serves to diffuse light exiting from the light guide plate 5 and being incident on the display (not shown in the figure), to thereby make uniform luminance distribution of the light. Repetitive prisms each having a triangular cross-section are repeatedly formed on the upside of the prism sheet 7, to thereby concentrate the light diffused by the diffusion sheet 6 to a direction perpendicular to the plane of the display (not shown in the figure), so as to enhance the brightness.

Accordingly, the light going through the prism sheet 7 mostly proceeds perpendicularly relative to the plane of the display (not shown in the figure), whereby to have uniform luminance distribution. Additionally, the protection sheet 8 is stacked on the prism sheet 7 to diffuse light incident through the prism sheet 7 at the same time of protecting the surface of the prism sheet 7, so as to make uniform distribution of the light.

It is found by careful observation of the optical sheets, particularly of the diffusion sheet, that, with the recent tendency of LCDs such as lightweight, ultrathin and highly bright and increased use of LED lamps, there is a need to obtain a diffusion sheet with diffusing effect and without loss of luminance while concealing the arrangement mode of lamps.

Relevant thereto, the prior-art microlens is formed by arranging a single layer of semispherical patterns into a column by means of a UV adhesive, but the prior-art technology fails to conceal the haze of the arrangement mode of the LED lamps at the same time of avoiding loss of luminance.

U.S. Pat. No. 7,160,018 discloses a backlight system for forming a nano-particle layer at a micro-thin structural surface of a light guide plate. The patent attempts to improve luminance of light supplied to a liquid crystal display device by virtue of a nano-particle layer disposed on the surface of the light guide plate. This prior-art technology is problematic in the fact that it is relatively difficult to uniformly apply the nano-particle layer on the surface of the light guide plate, which is made of a hard material, as this is achievable only by such means as chemical deposition.

Other prior-art technologies are so restricted as to only supply nano-particles inside the light guide plate or inside the micro-thin structural surface of the lens, and there is hence still a problem of being easily scratched due to contact between other optical sheets and the protection sheet.

It is therefore needed to obtain a micro-molded sheet having certain rigidity and the property against distortion or bending at the same time of guaranteeing transmissivity and the diffusing effect, and enhancing haze and concealing performance to reduce loss of luminance.

SUMMARY OF THE INVENTION

Accordingly, aiming to overcome deficiencies in the prior art, the present invention provides a micro-molded sheet for a backlight module with improved rigidity, ultrathin and lightweight properties while loss of luminance is reduced, and defects on the micro-molded sheet are concealed or offset.

In order to achieve the above objective, the present invention provides a micro-molded sheet for a backlight module, which sheet includes a base material layer, which is formed from a transparent material, a coating, which is formed on an upper surface of the base material layer and contains an adhesive and nano-particles, and a micro-molded array layer, which is disposed on an upside of the coating.

According to another aspect of the embodiments of the present invention, the coating may have a thickness of 0.1 to 3 µm.

According to still another aspect of the embodiments of the present invention, the nano-particles comprise at least one of silica, alumina, titania, zirconia, aluminum hydroxide, barium sulfide, magnesium silicate, or a mixture thereof.

According to yet another aspect of the embodiments of the present invention, the nano-particles are formed from silica and have a particle diameter of 10 to 100 nm.

According to a further aspect of the embodiments of the present invention, the coating contains 5 to 50 parts by weight of the nano-particles relative to 100 parts by weight of the adhesive.

The micro-molded sheet for a backlight module according to the present invention makes use of a hardened adhesive having an acrylic resin or a polyurethane acrylate component with excellent elasticity in the coating that contains nano-particles at the underside of the micro-molded array layer, whereby it is possible to enhance the rigidity of the coating at the underside of the micro-molded array layer, and to avoid the phenomenon that the micro-molded sheet twists or bends towards the surface of the micro-molded array layer.

Moreover, due to specific content of nano-particles in the coating, the micro-molded sheet has excellent diffusing effect, whereby it is possible to effectively conceal or offset defects of the light guide plate and the optical sheets at the same time that loss of luminance can be avoided.

EXPLANATIONS OF THE ACCOMPANYING DRAWINGS

The accompanying drawings herein explained are used to provide further comprehension about the present invention, and constitute part of the present application, but do not restrict the present invention. In the drawings.

REFERENCE NUMERALS

Figure 1:
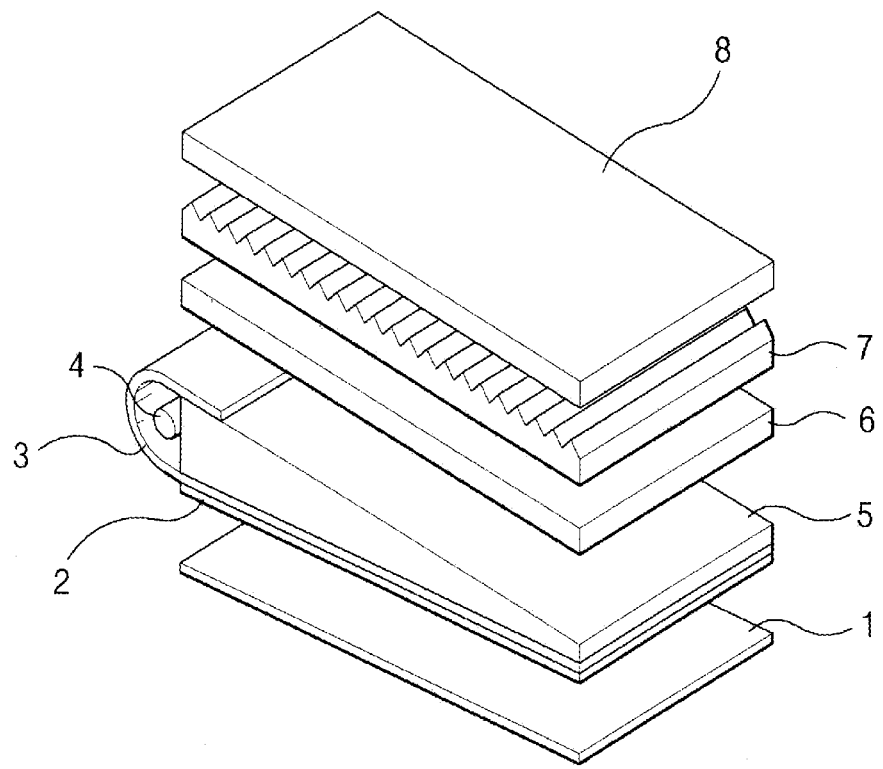
FIG. 1 is a schematic view summarily illustrating a prior-art backlight module.

1: modular frame
3: light source reflecting plate
5: light guide plate
7: prism sheet
9: micro-molded pattern
2: reflecting plate
4: light source
6: diffusion sheet
8: protection sheet
10: micro-molded pattern forming device
11, 30: drawing rollers
12, 40: winding rollers
13a, 13b, 41, 42, 51, 52: transferring rollers
14a, 14b: pressing rollers
16: resin injection member
21: base material layer
22a: nano-particles
23: micro-molded array layer
60: drying module
15: patterning roller
20: micro-molded sheet
22: coating
22b: adhesive
50: nano-applying module
70: UV-hardening module Specific Embodiments for Carrying Out the Invention To make clearer the objectives, technical solutions and advantages of the present invention, specific embodiments of the present invention are described in detail below with reference to the accompanying drawings. Herein, the exemplary embodiments of the present invention and descriptions thereof are meant to explain, rather than to restrict, the present invention.

Figure 2:
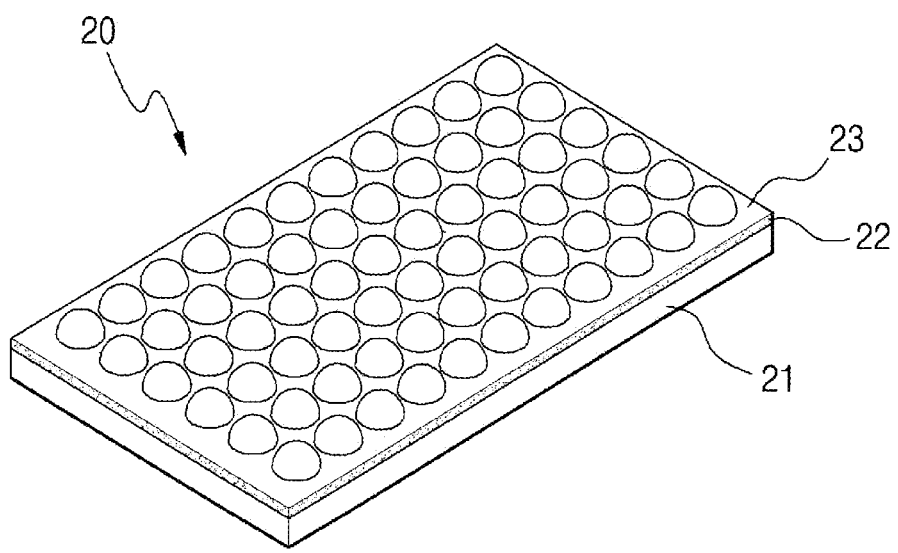
FIG. 2 is a side view illustrating the micro-molded sheet according to the embodiments of the present invention.
Figure 3:
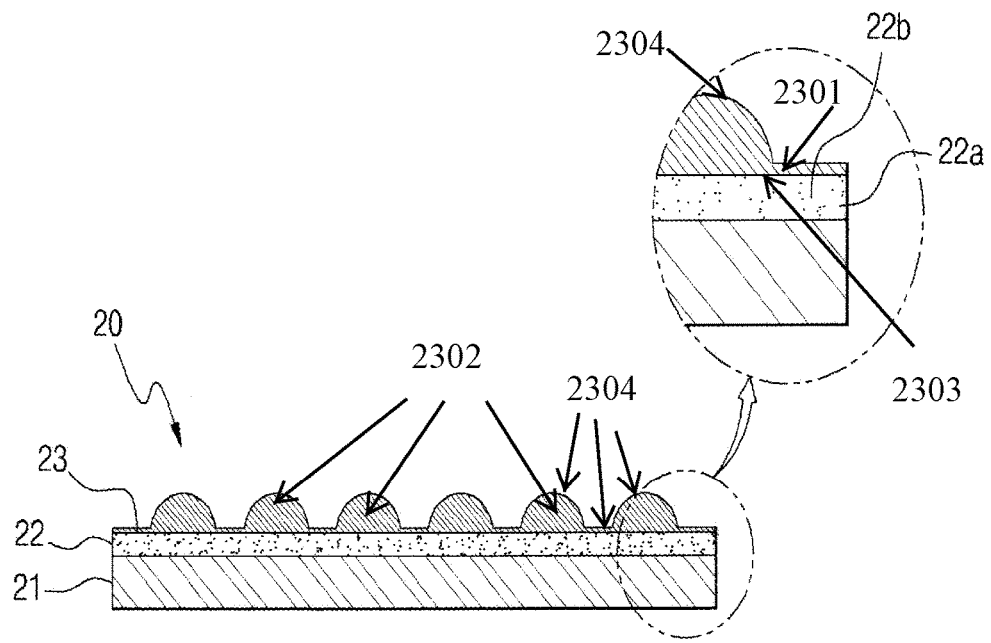
FIG. 3 is a sectional view illustrating the micro-molded sheet according to the embodiments of the present invention in the transversal direction.
Figure 4:
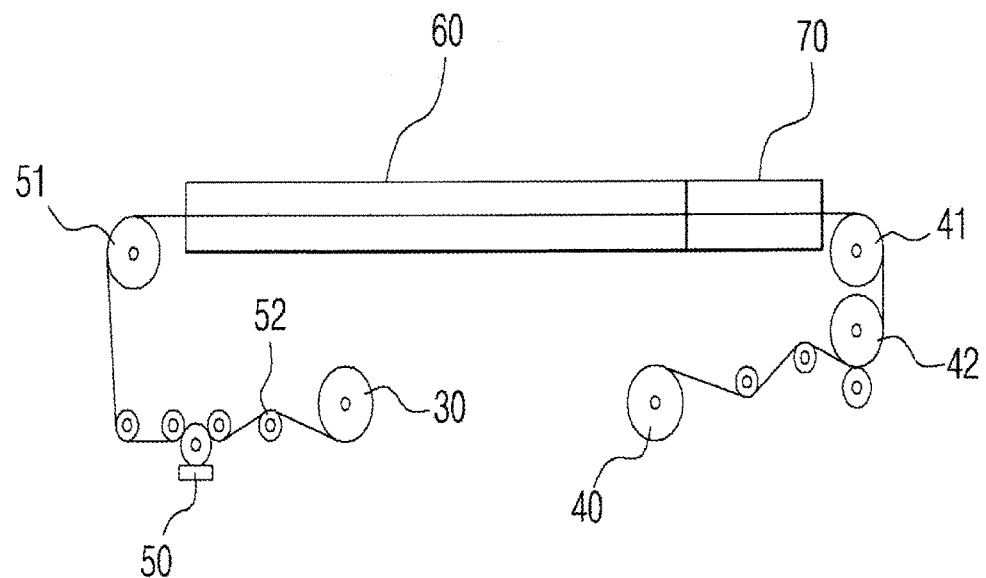
FIG. 4 is a view summarily illustrating the process of forming the coating on the upper surface of the base material layer according to the embodiments of the present invention.
Figure 5:
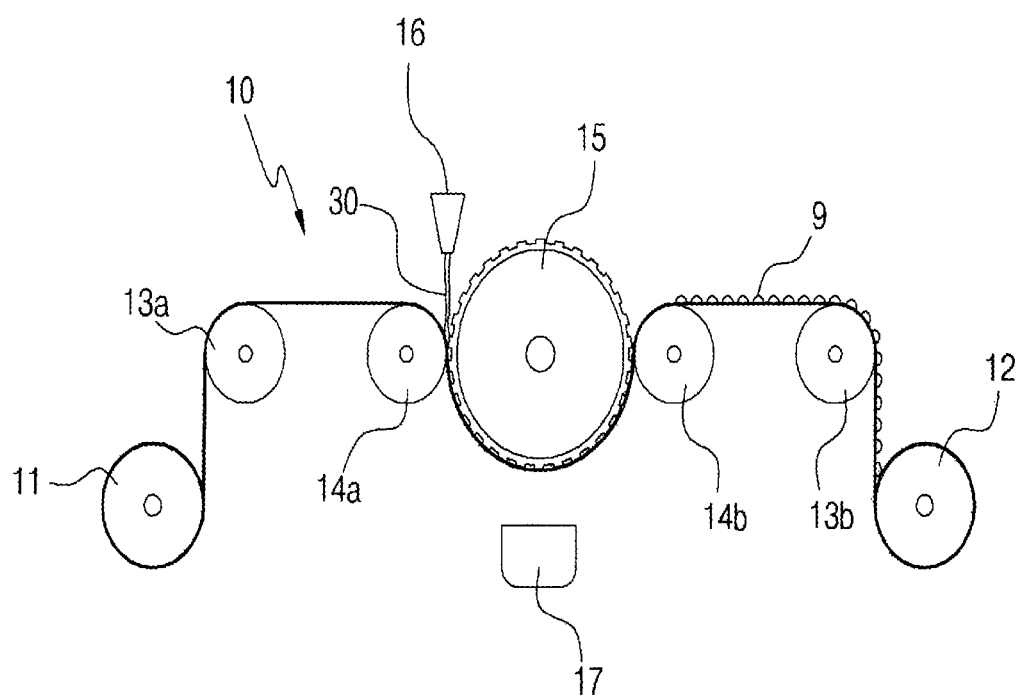
FIG. 5 is a view summarily illustrating the process of forming a micro-molded pattern on the upside of the coating according to the embodiments of the present invention.

FIG. 2 is a side view illustrating the micro-molded sheet according to the embodiments of the present invention, FIG. 3 is a sectional view illustrating the micro-molded sheet according to the embodiments of the present invention in the transversal direction, FIG. 4 is a view summarily illustrating the process of forming the coating on the upper surface of the base material layer according to the embodiments of the present invention, and FIG. 5 is a view summarily illustrating the process of forming a micro-molded pattern on the upside of the coating according to the embodiments of the present invention.

As shown in FIGS. 2 and 3, the micro-molded sheet 20 according to the present invention includes a base material layer 21, a coating 22 and a micro-molded array layer 23. The base material layer 21 serves to transfer light incident from below to the above, and is formed from such a transparent material as a transparent synthetic resin for the effective transmission of light.

The transparent synthetic resin exemplarily includes plastic thin films prepared from polyethylene terephthalate (PET), polyethylenenaphthalate (PEN), polyethylene, polycarbonate, and polyester, but is not limited thereto. For instance, Cosmoshine sold by the Japanese Toyobo Company and Lumilar of the Toray Company may serve as the base material layer 21.

Preferably, such polyester fiber polymers as polyethylene terephthalate and polyethylenenaphthalate in the transparent synthetic resin have more desirable transparency and strength.

Additionally preferably, one or more of the transparent synthetic resins may be mixed for use in combination, and may be added with a cross-linking agent, an antioxidant, a photo stabilizer, a filling agent, reinforced fibers, a reinforcing agent, an antistatic agent, a flame retardant, a plasticizer, an antideteriorant, and other additives to improve heat resistance and property against weathering.

The base material layer 21 is so thickened as not only to be thin enough for placement in a display device but also to be thick enough to resist bending. Preferably, the base material layer 21 has a thickness of approximately 100 to 250 μm. If the above range is exceeded, there will be problems that brightness is lowered and ultrathin property of the display device cannot be satisfied; if the thickness falls short of the above range, twisting might occur and operation might become difficult when the diffusion layer 22 is stacked on the base material layer.

The coating 22 according to the present invention is formed on the upper surface of the base material layer, and contains an adhesive 22b and nano-particles 22a included in the adhesive in a dispersed manner. Preferably, the coating 22 is coated to have a thickness of 0.1 to 3 μm after drying and UV-hardening.

The nano-particles 22a may use one or more of silica, alumina, titania, zirconia, aluminum hydroxide, barium sulfide and magnesium silicate, or a mixture thereof. Preferably, particles easily acquiring nanometer level and silica that has less light shielding property and excellent dispersing property and that helps improve heat resistance and rigidity may be used.

The nano-particles 22a may be shaped of any a ball, a spindle, a plate, and a fiber, but the ball shape is preferred in order to reduce the shielding of light.

The nano-particles 22a preferably have a size of 10 to 100 nm. If the above range is exceeded, shielding of light will be reduced due to the influence of short wavelength to thereby reduce brightness; if the size falls short of the above range, there will be the problem of aggregation due to rising of energy at surfaces of the nano-particles 22a.

Light passing through the coating 22 is scattered through the nano-particles 22a, whereby it is possible to effectively conceal or offset dark spots observable when there are defects in the micro-molded array layer 23 and the micro-molded sheet 20.

The coating 22 preferably contains 5 to 50 parts by weight of the nano-particles 22a relative to 100 parts by weight of the adhesive 22b. If the content of the nano-particles 22a is less than 5 parts by weight, the effects of enhancing dispersibility and rigidity will be insufficient; if the content exceeds 50 parts by weight, this will lead to loss of luminance though dispersibility and rigidity will be enhanced.

The adhesive 22b that constitutes the coating 22 may be selected from at least one resin selected from polycarbonate (PC), polyethylene terephthalate (PET), polyacrylate (PAR), urethaneacrylate (UA), polyetherimide (PEI), polyethylenenaphthalate (PEN), polyphenylene sulfide (PPS), polyarylate, and polyimide. Preferably, the adhesive 22b is fabricated from polyacrylate resin or urethaneacrylate that has excellent elasticity, so as to enhance water resistance and property against twisting of the adhesive 22b as well as the uniform dispersibility of the nano-particles 22a.

Moreover, the adhesive 22b may preferably further include such a hardener as a polyisocyanate compound, and inclusion of such a hardener makes it possible to compensate for the problem of reduction in the hardening reaction speed even if a cationic antistatic agent having excellent antistatic effect is added to stabilize dispersion of the nano-particles 22a.

The micro-molded array layer 23 comprise a first layer 2301 that is disposed on the upside of the coating 22 and includes a planarization light incident surface 2303 and a light exiting surface formed with micro-molded patterns thereon 2304.

The micro-molded array layer 23 may be formed from the same resin as the base material layer is formed.

The micro-molded array layer 23 further comprise a plurality of microlens 2302. The microlens 2302 of the micro-molded array layer 23 may be a spherical lens with a sphere coefficient or an elliptical lens with an ellipse coefficient, and the various micro-molded patterns may be differently sized.

Preferably, the micro-molded array layer 23 has a height of 16 to 24 µm and a width of 35 to 48 µm. Additionally, the micro-molded patterns occupy 70 to 90% of the surface of the micro-molded array layer 23, and the area ratio of the micro-molded patterns is set so because, within the ranges of the aforementioned height and width, the brightness and diffusing performance of visual angles of the micro-molded patterns reach the maximum, and this helps enhance the brightness at the front side.

As shown in FIG. 4, preferably, the coating fabrication process of the micro-molded sheet 20 according to the present invention can be realized by means of a drawing roller 30, a winding roller 40, a plurality of transferring rollers 41, 42, 51, 52, a nano-applying module 50, a drying module 60 and a UV-hardening module 70.

The drawing roller 30 draws the base material layer 21, and the winding roller 40 winds the base material layer 21 that forms the coating 22. The plurality of transferring rollers 41, 42 transfer the base material layer 21 with the coating 22 hardened by the drying module 60 and the UV-hardening module 70.

The nano-applying module 50 includes nano-particles 22a and an adhesive 22b mixed with a volatile solvent, wherein the nano-particles 22a may include one or more of silica, alumina, titania, zirconia, aluminum hydroxide, barium sulfide and magnesium silicate, or a mixture thereof, and the volatile solvent includes such alcohols as methanol, ethanol, n-propanol, ISO propanol, n-butanol, and ISO butanol, and may further include such ketones as methyl ethyl keton and methyl isobutyl ketone (MIBK). The nano-applying module 50 forms the coating 22 on the base material layer 21, and the winding roller 40 winds the base material layer 21 formed with the coating for safekeeping.

Additionally, in order to enhance the dispersibility of nano-particles 22a contained in the adhesive 22b, the adhesive 22b may further include a dispersion stabilizer of surfactants of cationic, anionic, nonionic, and fluorineetc.; preferably, the adhesive includes a photopolymerization initiator.

In the present invention, the method of applying a dispersion for the required nano-particles 22a on the coating 22 is not particularly restricted insofar as the method can carry out uniform application. Variously applying methods including the general gravure coating method, wire-drawing coating method, spraying method, micro-gravure coating method and slot die coating method may be used. Moreover, it is also possible to employ on practical demand such injecting methods as ink-jetting method and such applying methods as screen printing method.

After the base material layer 21 is applied via the nano-applying module 50, it is hardened via the drying module 60 and the UV-hardening module 70, and is wound for safekeeping via the winding roller 40.

A preferred embodiment is described below with reference to FIG. 5 for forming the micro-molded array layer 23 on the upside of the coating 22 after the aforementioned process of forming the coating 22.

The process of fabricating the micro-molded array layer 23 of the micro-molded sheet 20 according to the present invention can be carried out by a micro-molded pattern forming device 10 as shown in FIG. 5. The micro-molded pattern forming device 10 includes a drawing roller 11, a winding roller 12, a plurality of transferring rollers 13a, 13b, pressing rollers 14a, 14b, a patterning roller 15, a resin injection member 16 and a hardening member 17.

The drawing roller 11 draws the base material layer 21 with the coating 22, and the winding roller 12 winds the base material layer 21 with the coating 22 on the upside of which the micro-molded array layer 23 is formed. The plurality of transferring rollers 13a, 13b transfer the base material layer 21 with the coating 22 drawn by the drawing roller 11 and wound by the winding roller 12.

The resin injection member 16 supplies a liquid resin 30 that is to form micro-molded patterns 9, whereby the resin 30 is filled in a plurality of recesses in the shape of micro-molded patterns formed on an outer peripheral surface of the patterning roller 15, and a resin film is formed at the outer peripheral surface of the patterning roller 15.

Meanwhile, the pressing rollers 14a, 14b and the patterning roller 15 are rotated to exert a certain pressure onto the upside of the coating 22, whereby the resin 30 and the resin film are attached to the upside of the coating 22 by virtue of interaction and pressing force of the pressing rollers 14a, 14b and the patterning roller 15 that closely cling to one another. The micro-molded array layer 23 is thereafter formed on the upside of the coating 22 through hardening by the hardening member 17.

The micro-molded sheet 20 according to the present invention can be fabricated by the aforementioned processes of fabricating the coating 22 and the micro-molded array layer 23, and the micro-molded sheet 20 according to the present invention as thus fabricated possesses the effects with reduced loss of luminance and improved concealment or offset of defects exposed on the diffusion sheet, and the effects with enhanced rigidity, ultrathin and lightweight properties.

the objectives, technical solutions and advantageous effects of the present invention have been explained in detail with respect to the specific embodiments as recited above. As should be understood, the ones described above are merely specific embodiments of the present invention and are not meant to restrict the protection scope of the present invention. Any modification, equivalent substitution and improvement makeable within the spirits and principles of the present invention shall all be covered by the protection scope of the present invention.

The invention claimed is:

1. A micro-molded sheet for a backlight module, comprising:
   (i) a base material layer, formed from a transparent material and having a thickness of 100 to 250 μm;
   (ii) a coating comprising:
      (1) an adhesive including a photopolymerization initiator; and
      (2) a plurality of nano-particles that are uniformly dispersed into the adhesive, wherein
         (a). each of the nano-particles has a particle diameter of 10 to 100 nm;
         (b). the coating contains 5 to 50 parts by weight of the nano-particles relative to 100 parts by weight of the adhesive;
         (c). the coating is formed on an upper surface of the base material layer and has a thickness of 0.1 to 3 μm after the coating is hardened through a drying module and a UV-hardening module; and
         (d). at least some of the nano-particles are shaped of a ball; and
   (iii) a micro-molded array layer comprising:
      (1) a first layer, formed on an upside of the coating by applying a liquid resin on the hardened coating and having a planarization light incident surface being in alignment with the adhesive; and
      (2) a plurality of microlens on top of the first layer forming micro-molded patterns, wherein the plurality of microlens is formed by using a patterned member to press the liquid resin onto the hardened coating, and the liquid resin is hardened through a hardening member, wherein
         (a). the micro-molded array layer has at least one of the plurality of microlens with sphere coefficients;
         (b). the plurality of nano-particles produces scattering to effectively conceal or offset dark spots observable when there are defects in the micro-molded array layer and the micro-molded sheet;
         (c). the micro-molded array layer has a height of 16 to 24 μm and a width of 35 to 48 μm;
         (d). a part of upper surfaces of the first layer and upper surfaces of the plurality of microlens form a light exiting surface formed with micro-molded patterns thereon; and
         (e). the micro-molded patterns occupy 70-90% of the surface of the micro-molded array layer, whereby the micro-molded sheet is provided with excellent diffusing effect, enabling effective concealment or offset defects of a light guide plate and optical sheets at the same time of avoiding loss of luminance.

2. The micro-molded sheet for a backlight module according to claim 1, wherein the plurality of nano-particles comprises at least one of silica, alumina, titania, zirconia, aluminum hydroxide, barium sulfide or magnesium silicate, and a mixture thereof.

3. The micro-molded sheet for a backlight module according to claim 1, wherein the plurality of nano-particles is formed from silica.

4. The micro-molded sheet for a backlight module according to claim 1, wherein the adhesive comprises at least one resin selected from polycarbonate, polyethylene terephthalate, polyacrylate, urethaneacrylate, polyetherimide, polyethylenenaphthalate, polyphenylene sulfide, polyarylate, or polyimide.

5. The micro-molded sheet of claim 4, wherein the adhesive comprises at least one resin selected from polycarbonate, polyethylene terephthalate, urethaneacrylate, polyetherimide, polyethylenenaphthalate, polyphenylene sulfide, polyarylate, or polyimide.

6. The micro-molded sheet of claim 5, wherein the adhesive comprises at least one resin selected from polycarbonate, polyethylene terephthalate, urethaneacrylate, polyethylenenaphthalate, polyphenylene sulfide, or polyarylate.

7. The micro-molded sheet of claim 1, wherein the adhesive comprises a hardener to facilitate hardening of the coating through the drying module and the UV-hardening module.

8. The micro-molded sheet of claim 7, wherein the hardener comprises a polyisocyanate compound.

* * * * *